UNITED STATES PATENT OFFICE.

BERTHOLD MUELLER, OF CINCINNATI, OHIO.

COMPOUND FOR PURIFYING BEER.

SPECIFICATION forming part of Letters Patent No. 338,284, dated March 23, 1886.

Application filed September 24, 1885. Serial No. 178,097. (No specimens.)

*To all whom it may concern:*

Be it known that I, BERTHOLD MUELLER, a citizen of the United States of America, residing at Cincinnati, in the county of Hamilton and State of Ohio, have invented certain new and useful Improvements in Clearing Beer from Impurities, Consisting of a Compound, of which the following is a specification.

Heretofore beer has been purified by the use of isinglass dissolved in warm water and used as soon as same was dissolved, by which process it took about one pound of isinglass to purify one thousand gallons of beer.

The object of my invention is to purify beer or other malt liquor in a more economical manner than has heretofore been known, which manner is as follows, viz: I take one-half ounce of tartaric acid in a crystallized form, dissolve same in one gallon of water heated to a temperature of 75° Fahrenheit, then add one-fourth (¼) pound of isinglass, then cover the compound and keep it in a temperature of 65° Fahrenheit. After ten or twelve hours I remove the cover and thoroughly mix the compound, adding at same time about two quarts of water, after which it should stand for about four or five days, when it should be thoroughly mixed or cut with a wire or willow broom, adding five gallons of beer, and then use same by pouring a sufficient amount of the compound or solution into the tub or barrel of beer, leaving the bung setting loosely over the bung-hole for about two hours, and then remove the bung from the hole until the beer is ready to draw off into kegs.

The above quantity of the compound or solution will purify from twelve to fourteen hundred gallons of beer, and the quantity to be used in a tub of beer should be regulated accordingly. The beer should be thoroughly agitated after the compound has been poured into it.

A mixture of isinglass and acid has been heretofore used for fining.

What I desire to claim is—

A compound for purifying beer, consisting of tartaric acid, one-half ounce, (in crystallized form;) pulverized isinglass, one-fourth pound; water, one-half gallon, and beer five gallons, mixed for use, substantially as set forth.

In testimony whereof I affix my signature in presence of two witnesses.

BERTHOLD MUELLER.

Witnesses:
FRITZ HOECKELMANN,
DAVID S. VANPELT.